2,992,988
GREASE COMPOSITION COMPRISING A SOLUTION OF A CHLOROTRIFLUOROETHYLENE VINYLIDENE FLUORIDE COPOLYMER IN A LOW MOLECULAR WEIGHT CHLOROTRIFLUOROETHYLENE POLYMER
Charles D. Dipner, Cranford, N.J., assignor, by mesne assignments, to Minnesota Mining and Manufacturing Company, St. Paul, Minn., a corporation of Delaware
No Drawing. Filed Nov. 23, 1954, Ser. No. 470,807
6 Claims. (Cl. 252—58)

This invention relates to novel fluorocarbon composition which are variously useful as lubricating or filleting compositions.

Certain of the novel compositions of the invention have a putty-like consistency and retain their consistency over a broad range of temperatures. For example, certain of the putty-like compositions retain their consistency at temperatures between −65° F. and 165° F., hence these compositions can be used as flexible low temperature sealants having low volatility and good adhesive properties when applied to metals and they are especially useful as filleting compounds when applied to gaps in aluminum structures. These compositions are resistant to penetration and swelling when in contact with corrosive chemicals, such as white fuming nitric acid, and they are also resistant to hydrocarbon fuels.

The greases produced in accordance with the present invention are useful in applications where lubrication of moving parts is required in the presence of corrosive chemicals, hydrocarbon fuels, and the like.

In the present invention, polychlorotrifluoroethylene polymers are mixed with copolymers which may be copolymers of chlorotrifluoroethylene and vinylidene fluoride, for example. The polymers are obtained by separating into fractions, such as oils, greases, and waxes, the high molecular weight polymerization products of chlorotrifluoroethylene and then pyrolyzing or cracking these polymerization products, either singly or together, under appropriate conditions to rupture the ethylenically unsaturated carbon to carbon linkages whereby a halocarbon oil of lower boiling range and of lower molecular weight than the original polymerization product is produced. The cracked halocarbon oil is separated from lower boiling halocarbons and may be further separated into particular fractions. This process is more specifically disclosed in U.S. Patent 2,636,907, granted on April 28, 1953, to William T. Miller.

The copolymers which are mixed with polychlorotrifluoroethylene oils may be elastomeric copolymers of a perfluorochloroethylene, such as chlorotrifluoroethylene, and fluoroethylene, such as vinylidene fluoride; the copolymers contain between about 20 mole percent and about 69 mole percent of the perfluorochloroethylene and the remaining major constituent is the fluoroethylene. These copolymers may be prepared using conventional polymerization recipes and reaction conditions known to the art. The preparation of these and other similar copolymers which may be used in the present invention is disclosed in copending application Serial No. 332,218, filed January 21, 1953, now U.S. 2,752,331.

The copolymers may also be copolymers of a perfluorochloroethylene, such as chlorotrifluoroethylene, and a fluoroethylene, such as vinylidene fluoride, the copolymers containing the perfluorochloroethylene in an amount which is more than 69 mole percent and not higher than about 80 mole percent, with the remaining major constituent being the fluoroethylene, such as vinylidene fluoride. These copolymers are prepared in a similar manner using conventional recipes and reaction conditions and the preparation thereof, together with that of other copolymers of similar type which can be used in the present invention, is disclosed in copending application Serial No. 332,186, filed January 21, 1953, now U.S. 2,752,332.

The fluorocarbon compositions of the invention generally contain 5 to 50 percent by weight of the copolymer of perfluorochloroethylene and fluoroethylene and preferably contain 10 to 35 percent by weight of this constituent. Formulations containing 25 percent by weight or more of copolymers are particularly desirable as putties whereas those containing less than 25 percent by weight of copolymers have more of the properties of greases.

The compositions of the invention may be prepared by mixing the copolymer of a perfluorochloroethylene and a fluoroethylene with the polymeric oils, greases or waxes of chlorotrifluoroethylene at a temperature of from 100° C. to 200° C., or higher and, preferably at a temperature of from 125° C. to 160° C. for a period of time sufficient to dissolve the copolymer in the polymer oil, grease or wax. Mixing times of from 0.5 to 50 hours, preferably 1 to 15 hours, are sufficient to obtain solution of the copolymer in the polymeric oil, grease, or wax.

Inert fillers of the type known to the art may also be added to the compositions of the invention, and these fillers may include carbon black, zinc oxide, graphite, calcium fluoride, diluent silica, and the like. The inert filler may be added in any desired quantity and may comprise from about 0.5 percent to 50 percent by weight of the final mixture.

If desired, a solid polymer of chlorotrifluoroethylene may be added to the fluorocarbon composition, and the addition of a composition of this type imparts additional resistance to corrosive chemicals and hydrocarbon fuels to the final composition due to the higher proportion of the chlorofluoro compound present in the final mixture. The solid polymer of polychlorotrifluoroethylene which is added is preferably a polymer having an N.S.T. in the plastic range.

The N.S.T. or no strength temperature is a measure of molecular weight and an N.S.T. of between about 210 and 350° C. is characteristic of a normally solid polymer of chlorotrifluoroethylene having thermoplastic characteristics. The best plastic characteristics of the normally solid polymer are observed at N.S.T. values between about 240 and 340° C.

The no strength temperature is determined in the following manner: A thermoplastic sample of polychlorotrifluoroethylene is hot pressed into a 1/16 inch sheet and cut into a strip measuring 1/8 inch x 1/16 inch x 1 5/8 inches. The strip is notched 5/8 inch from the top so that the dimensions at the notch are 1/16 inch x 1/16 inch. A fine wire and a standard weight are attached to one end of the strip, the weight of the polymer and the wire being 0.5 gram. The strip is then attached vertically in a furnace and the temperature of the sample is increased at a rate of about 1.5° C. per minute as the breaking temperature is approached. The no strength temperature is the breaking temperature of the sample and differences of about 5° C. are considered significant.

The invention will be further illustrated by reference to the following specific examples, in which all parts are by weight:

EXAMPLE 1

The fractions of polychlorotrifluoroethylene oils, greases, and waxes used in this and the subsequent examples have the characteristics disclosed in Table I below. These fractions were prepared by cracking high molecular weight polymers of polychlorotrifluoroethylene in accordance with the method previously described.

Table I

| Product No. | Type | Boiling Range at 1 mm. Vapor | Boiling Range at 1 mm. Temp., °C. | Pour Point, °C., Approximate | Melting Point, °C., Approximate |
|---|---|---|---|---|---|
| 1 | Light Oil | IBP | 110 | Below −37 | |
| 3 | Medium Oil | 110 | 140 | Below −37 | |
| 10 | Heavy Oil | 140 | 200 | −30 | |
| 40 | Grease | 200 | 230 | +29 | +30 |
| 150 | Wax | 230 and up | | +57 | +53 |

The copolymer which was mixed with the fractions of polychlorotrifluoroethylene oils, greases, or waxes was a copolymer of chlorotrifluoroethylene and vinylidene fluoride consisting of 51 mole percent of chlorotrifluoroethylene and 49 mole percent of vinylidene fluoride. This copolymer had an N.S.T. of 263° C., and a 0.5 percent solution viscosity, in a 1,1,3-trifluoropentachloropropane solvent, of 1.47 centistokes.

11 parts of the copolymer of chlorotrifluoroethylene and vinylidene fluoride described above, in granular form, were mixed with 33 parts of the polychlorotrifluoroethylene oil fraction #1 described in Table I above and heated for a period of 7 hours at a temperature of 150° C. The product when cooled had the consistency of a firm, non-tacky, rubbery putty.

EXAMPLE 2

5 parts of the copolymer of chlorotrifluoroethylene and vinylidene fluoride described in Example 1 above were mixed with 45 parts of the polychlorotrifluoroethylene oil fraction #1 described in Table I above and the mixture was heated for 1 hour at a temperature of 135° C. The product when cooled was found to possess the consistency of a soft, tacky grease.

EXAMPLE 3

6.1 parts of the copolymer of chlorotrifluoroethylene and vinylidene fluoride described in Example 1 above were mixed with 55 parts of the polychlorotrifluoroethylene #150 wax described in Table I above and the mixture was heated for 1 hour at a temperature of 135° C. The mixture when cooled was found to possess the consistency of a firm, tacky grease.

EXAMPLE 4

6 parts of the copolymer of chlorotrifluoroethylene and vinylidene fluoride, described in Example 1 above, and 8 parts of polychlorotrifluoroethylene #150 wax, described in Table I above, were mixed with 25 parts of polychlorotrifluoroethylene plastisol, the plastisol being a mixture of 20 percent by weight of a polychlorotrifluoroethylene plastic having an N.S.T. of 319° C. dispersed in polychlorotrifluoroethylene #1 oil described in Table I above. The mixture was heated for a period of 2 hours at a temperature of 135° C. and upon cooling the product was found to be a soft, slightly tacky, elastic putty.

EXAMPLE 5

6 parts of the copolymer of chlorotrifluoroethylene and vinylidene fluoride, described in Example 1 above, were mixed with 5 parts of a polychlorotrifluoroethylene thermoplastic powder having a solution viscosity of 2.4 centistokes and an N.S.T. of 314° C., and 33 parts of polychlorotrifluoroethylene #1 oil described in Table I above and heated for a period of 7 hours at a temperature of 150° C. The product when cooled was found to be a soft, non-tacky, non-elastic putty.

EXAMPLE 6

11 parts of the copolymer of polychlorotrifluoroethylene and vinylidene fluoride described in Example 1 above, and 33 parts of polychlorotrifluoroethylene #40 grease, described in Table I above, were mixed and heated for 7 hours at a temperature of 150° C. This heating did not completely dissolve the copolymer and the heating was therefore continued for 8 hours at a temperature of 190° C., whereupon a homogeneous mixture was produced. Upon cooling, a soft, tacky elastic putty was obtained.

It will be obvious to those skilled in the art that many modifications may be made within the scope of the present invention without departing from the spirit thereof, and the invention includes all such modifications.

I claim:

1. A grease composition consisting essentially of a solution in a chlorotrifluoroethylene polymer having a molecular weight in the oil, grease and wax range of above about 5 and less than 25 weight percent of a solid copolymer of chlorotrifluoroethylene and vinylidene fluoride, said copolymer containing between about 20 and about 80 mol percent of chlorotrifluoroethylene.

2. A grease composition consisting essentially of a solution in a chlorotrifluoroethylene polymer having a molecular weight in the oil, grease and wax range of above about 5 and less than 25 weight percent of a solid copolymer of chlorotrifluoroethylene and vinylidene fluoride, said copolymer containing between about 20 and about 69 mol percent of chlorotrifluoroethylene.

3. A grease composition consisting essentially of a solution in a chlorotrifluoroethylene polymer having a molecular weight in the oil, grease and wax range of above about 5 and less than 25 weight percent of a solid copolymer of chlorotrifluoroethylene and vinylidene fluoride, said copolymer containing between about 69 and about 80 mol percent of chlorotrifluoroethylene.

4. A grease composition consisting essentially of a solution in a distillable polymer of chlorotrifluoroethylene, produced by thermally cracking a normally solid polymer of chlorotrifluoroethylene, of above about 5 and less than 25 weight percent of a solid copolymer of chlorotrifluoroethylene and vinylidene fluoride, said copolymer containing between about 20 and about 80 mol percent of chlorotrifluoroethylene.

5. A grease composition consisting essentially of a solution of between about 65 and 95 weight percent of a low molecular weight chlorotrifluoroethylene polymer and above about 5 and less than 25 weight percent of a copolymer of chlorotrifluoroethylene and vinylidene fluoride containing between about 20 and about 80 mol percent of chlorotrifluoroethylene, and a high molecular weight chlorotrifluoroethylene polymer in the plastic range.

6. A grease composition consisting essentially of a solution of a polymer of chlorotrifluoroethylene in the oil, grease and wax range, above about 5 and less than 25 weight percent of a copolymer of chlorotrifluoroethylene and vinylidene fluoride having between about 20 and about 80 mol percent chlorotrifluoroethylene, and a high molecular weight chlorotrifluoroethylene polymer in the plastic range having a N.S.T. between about 210 and 350° C.

References Cited in the file of this patent

UNITED STATES PATENTS

| | | |
|---|---|---|
| 2,543,530 | Kropa | Feb. 27, 1951 |
| 2,576,837 | Irwin | Nov. 27, 1951 |
| 2,600,802 | Passino | June 17, 1952 |
| 2,689,241 | Dittman et al. | Sept. 14, 1954 |
| 2,706,715 | Conner | Apr. 19, 1955 |
| 2,770,615 | Kroncke | Nov. 13, 1956 |
| 2,774,109 | Kaufman | Dec. 18, 1956 |
| 2,792,377 | Miller | May 14, 1957 |